United States Patent
Nielsen (10) Patent No.: US 6,181,643 B1
(45) Date of Patent: Jan. 30, 2001

(54) INTERFEROMETER WITH A SINGLE PROJECTOR ARRAY AND A SINGLE RECEIVER ARRAY

(75) Inventor: Richard Ove Nielsen, Anaheim, CA (US)

(73) Assignee: The Boeing Company, Seattle, WA (US)

(*) Notice: Under 35 U.S.C. 154(b), the term of this patent shall be extended for 0 days.

(21) Appl. No.: 09/356,841

(22) Filed: Jul. 19, 1999

(51) Int. Cl.[7] .............................. G01S 15/00; G01S 3/80

(52) U.S. Cl. .................. 367/105; 367/103; 367/119; 367/122

(58) Field of Search .................... 367/87, 92, 99, 367/103, 105, 118, 119, 122, 124, 125, 126, 129; 342/156

(56) References Cited

U.S. PATENT DOCUMENTS

| | | | |
|---|---|---|---|
| 3,824,531 | * | 7/1974 | Walsh ................................ 367/105 |
| 4,596,007 | * | 6/1986 | Grall et al. ........................ 367/105 |
| 4,982,384 |   | 1/1991 | Pipkin et al. . |
| 5,295,119 |   | 3/1994 | Sarac . |
| 5,309,410 |   | 5/1994 | Kittower et al. . |
| 5,526,325 | * | 6/1996 | Sullivan et al. .................. 367/103 |
| 5,561,641 |   | 10/1996 | Nishimori et al. . |

OTHER PUBLICATIONS

Forward Looking Sonar Model STA–016; Sona Tech, Inc.; 1 page.*

D. Giuli, M. Fossi, L. Facheris; *Radar Target Scattering Matrix Measurement Through Orthogonal Signals*; IEE Proceedings–F; vol. 140, No. 4; Aug. 1993; pp. 233–242.*

B. Friedlander; *On the Cramer–Rao Bound for Time Delay and DopplerEstimation*;IEEE Transactions on Information Theory, vol. IT–30, No. 3; May 1984; pp. 575–880;.*

H. Messer, G. Singal, L. Bialy; *On the Achievable DF Accuracy of Two Kinds of Active Interferometers*; IEEE Transactions on Aerospace and Electronic Systems; vol. 32, No. 3; Jul. 1996; pp. 1158–1164.*

* cited by examiner

Primary Examiner—Ian J. Lobo
(74) Attorney, Agent, or Firm—Alston & Bird LLP (57) ABSTRACT

The interferometer, which is preferably in the form of a sonar, can have a single projector array and a single receiver array. The projector array comprises a first subset of projector elements that function as a first pseudo projector and a second subset of projector elements that function as a second pseudo projector. One or more of the projector elements belong in both the first and the second subsets, such that one or more of the projector elements function as part of both the first and the second pseudo projectors. A receiver is operative for receiving reflected portions of the signals emitted by the pseudo projectors. A processing system analyzes the signals received by the receiver to at least partially determine the position of an object.

19 Claims, 5 Drawing Sheets

INTERFEROMETER WITH A SINGLE PROJECTOR ARRAY AND A SINGLE RECEIVER ARRAY

FIELD OF THE INVENTION

The present invention relates generally to interferometers, such as sonars, that are used to detect and locate objects, and more particularly to interferometers having a single projector array.

BACKGROUND OF THE INVENTION

Interferometers, such as sonars, can be used to detect and locate objects. An active sonar projects a beam-like sound wave signal into the water, and an object that is in the path of the signal reflects a portion of the signal back to the sonar. The signal reflected back to the sonar is detected by the sonar and utilized to locate the object in the water.

Figure 1:
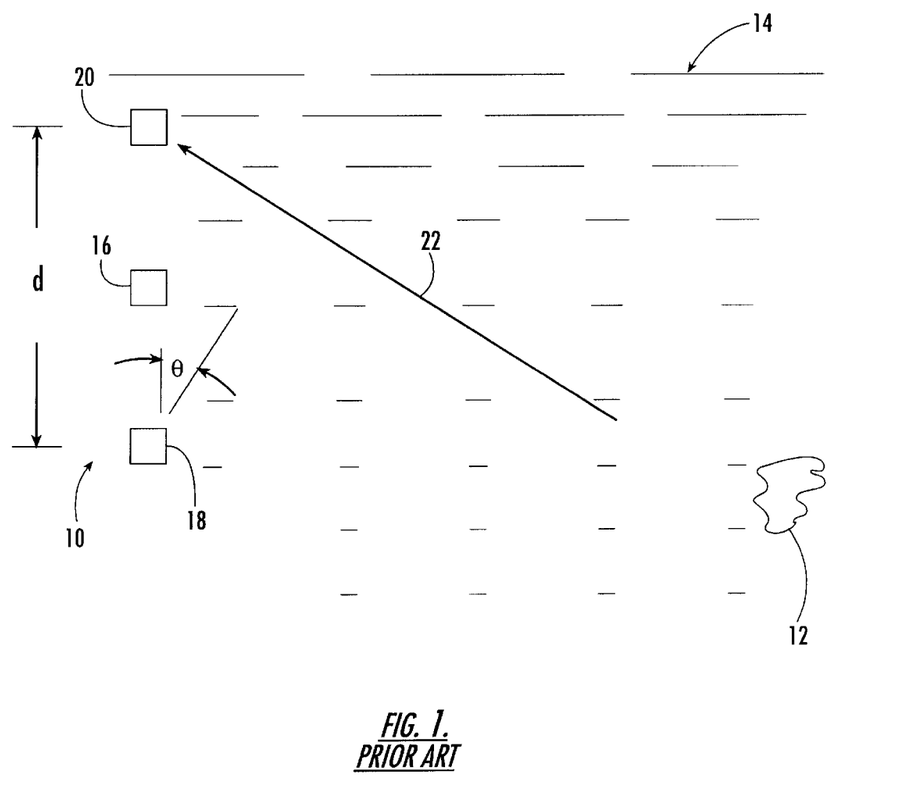
FIG. 1 diagrammatically illustrates a conventional active sonar system, which is of the type having one projector and two receivers, being used to locate an object in a body of water.

FIG. 1 diagrammatically illustrates a conventional active sonar system 10 that is being used to locate an object 12 positioned below the surface of a body of water 14. The conventional sonar system 10 includes a projector 16 that projects a sound wave signal s(t) into the water 14. Portions of the signal projected from the projector 16 are reflected from the object 12 to a lower receiver 18 and an upper receiver 20. The lower receiver 18 and the upper receiver 20 are separated by a vertical separation distance "d". A direction of return arrow 22 illustrates the direction of travel of the reflected portions of the signal (that is, the echoes) that are received by the upper receiver 20. A vertical arrival angle θ that partially defines the position of the object 12 is estimated by measuring the difference in the time of arrival of the echoes at the lower receiver 18 and the upper receiver 20. The vertical arrival angle θ is the angle of intersection between a line perpendicular to the direction of the return arrow 22 and the vertical plane of the receivers 18 and 20. The vertical arrival angle θ is solved from:

$$D = d \sin(\theta)/c$$

Inputs for solving for the vertical arrival angle θ from the above equation consist of:
replica of output from the projector 16:

$$r_1(t) = s(t) + n_1(t)$$

echo at the lower receiver 18:

$$r_2(t) = As(t-\tau) + n_2(t)$$

echo at the upper receiver 20:

$$r_3(t) = As(t-\tau-D) + n_3(t)$$

In the immediately preceding equations, $n_1(t)$ represents noise and is typically zero for a noise-free replica. In addition, $n_2(t)$ and $n_3(t)$ are uncorrelated zero mean white Gaussian noise waveforms. The signal s(t), which is projected, or transmitted, from the projector 16, is a pulse of length T seconds. The term "A" is the amplitude of the signal s(t). The delay "τ" is the delay between transmission of the signal s(t) and reception of the corresponding echo at the lower receiver 18. The delay "D" is the delay between the reception of the echo at the lower receiver 18 and the upper receiver 20. The term "c" is a constant representing the speed of the projected signal s(t) through the respective medium, which in accordance with the preferred embodiment of the present invention is the speed of sound in water.

The conventional sonar system 10 requires both of the receivers 18 and 20 in order to determine the vertical arrival angle θ. It is typical for each of the receivers 18 and 20 to include an array of many receiver elements, such as forty-eight receiver elements, and for each of the receiver elements to require its own analog conditioning electronics and analog-to-digital converter. That is, each of the receivers 18 and 20 includes an array of tens of hydrophones, and each hydrophone requires a separate electronics assembly. Further, digital processing circuitry is required for each of the receiver elements. Additionally, it is typical for the projector 16 to include an array of many projector elements, such as sixteen projector elements and for each projector element to require its own analog conditioning electronics and digital-to-analog converter. That is, the projector 16 includes an array of transducers, and each transducer requires a separate electronics assembly. Further, digital processing circuitry is required to present the desired signal to each of the projector elements.

Conventional sonar systems 10 are often deployed on watercraft, such as unmanned undersea vehicles, and in some cases the resources associated with the watercraft, such as space, power, weight and processing capability, are limited. Thus, the inclusion of many receiver elements, and their associated electronics assemblies and digital processing, can be prohibitive. In addition, the cost of the electronics for all of the parallel processing channels can be substantial.

It is also known for an interferometer to have two projectors and one receiver. For example, see H. Messer, G. Singal, and L. Bialy, *On the Achievable DF Accuracy of Two Kinds of Active Interferometers*, IEEE Transactions on Aerospace and Electronic Systems, Vol. 32, No. 3, July 1996, pp. 1158–1164, which is incorporated herein by reference.

The use of a sonar system having two separate projector arrays, each having many projector elements and their associated electronics assemblies and digital processing, and one receiver array having many receiver elements and their associated electronics assemblies and digital processing could be prohibitive in situations where space, power, weight and processing resources are limited. And again, the cost of the electronics for all of the parallel processing channels can be substantial. In addition, when using two separate projector arrays with many projector elements, each projector array may interfere with the other projector array by at least partially physically blocking the signals of the other projector array.

SUMMARY OF THE INVENTION

The present invention solves the problems identified above and provides other advantages by providing an interferometer, or more particularly a sonar system, which preferably has a single projector array and a single receiver array. The projector array comprises a first subset of projector elements that function as a first pseudo projector and a second subset of projector elements that function as a second pseudo projector. One or more of the projector elements of the projector array belong in both the first and the second subsets, such that one or more of the projector elements function as part of both the first and second pseudo projectors. This allows the system of the present invention to perform similarly to conventional systems while requiring less resources, such as less space, power, weight and processing capability, than conventional systems. The present invention also provides a system that is improved with respect to hardware and software complexities, cost, and reliability in comparison to conventional systems.

More specifically, the interferometer or sonar system of the present invention includes at least one projector assembly that includes a plurality of projector elements. At least a first and a second of the projector elements are each operative to provide a first signal so that at least the first and second projector elements function together as a first pseudo projector that provides the first signal. At least a third of the projector elements and the second projector element are operative to provide a second signal so that at least the second and third projector elements function together as a second pseudo projector that provides the second signal. Thus, the second projector element functions as part of both the first pseudo projector and the second pseudo projector while the first and third projector elements function only as part of the first pseudo projector and the second pseudo projector, respectively. A separation distance is defined between the centers of the first and second pseudo projectors. The first and second pseudo projectors are operative to contemporaneously provide the first and second signals, such that the second projector element provides a third signal that is a sum of the first and second signals. The first and second signals are preferably orthogonal sound waves that are provided periodically for a duration that is shorter than the period.

Stated differently, at least a first of the projector elements is operative to provide a first signal and a second signal. At least the first projector element functions as a first pseudo projector that provides the first signal. At least a second of the projector elements is operative to provide the second signal. At least the first and second projector elements function together as a second pseudo projector that provides the second signal. Therefore, the first projector element functions as part of both the first and second pseudo projectors. The first and second pseudo projectors are operative to contemporaneously provide the first and second signals, which are preferably orthogonal sound waves that are provided periodically for a duration that is shorter than the period.

The interferometer or sonar system also includes a receiver that is operative for receiving reflected portions of the signals emitted by the pseudo projectors. In addition, the interferometer or sonar system includes a processing system for analyzing the received reflected portions to at least partially determine the position an object.

Because the sonar system of the present invention is capable of having a single receiver array and a single projector array, which has a first subset of projector elements that function as a first pseudo projector and a second subset of projector elements that function as a second pseudo projector, the sonar system is well suited for applications in which space, power, weight and processing resources are limited. In addition, the sonar system of the present invention can cost less than comparable prior sonar systems.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
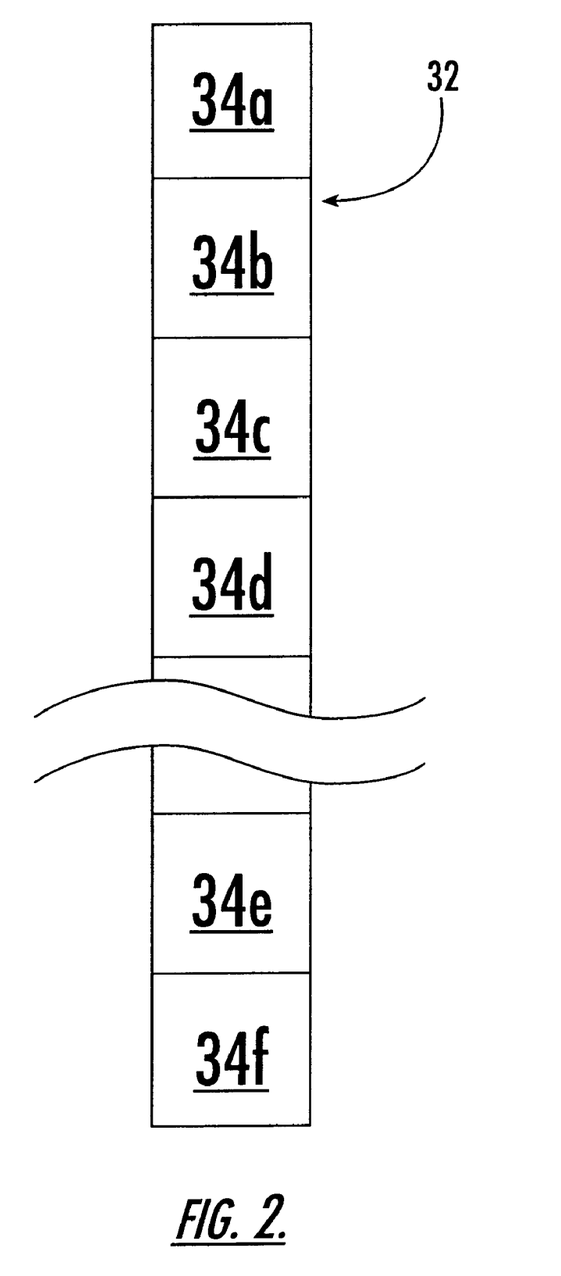
FIG. 2 diagrammatically illustrates a projector of the sonar system of one embodiment of the present invention.
Figure 3:
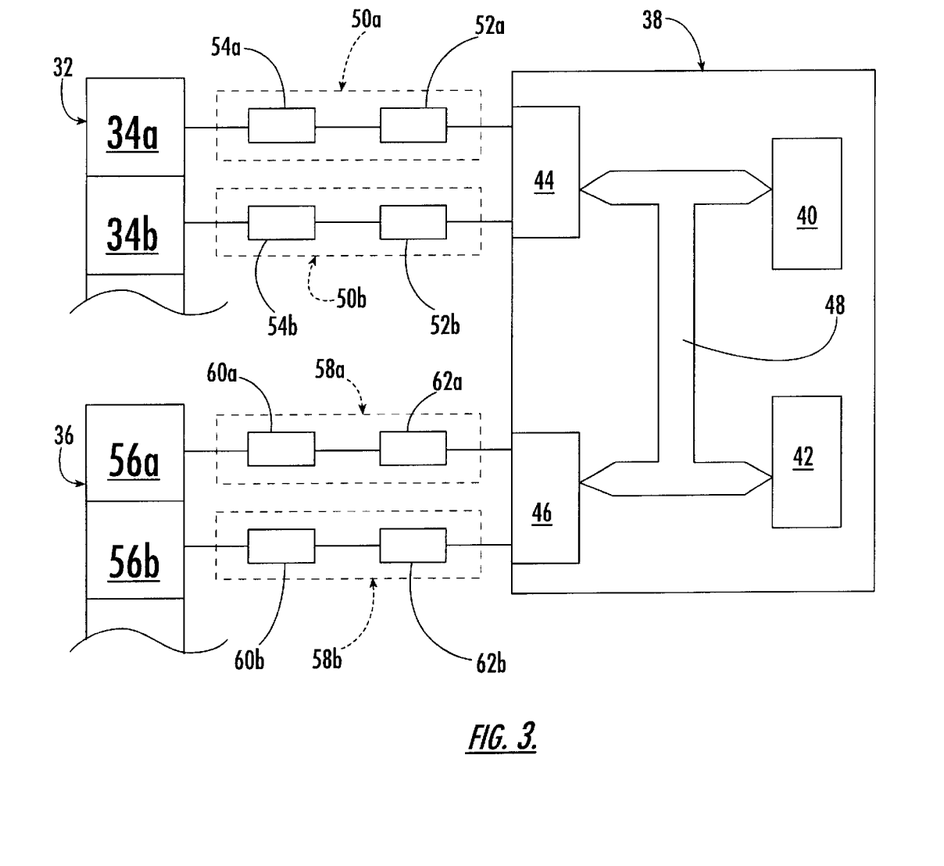
FIG. 3 is a block diagram illustrating portions of the sonar system of one embodiment of the present invention, including portions of the projector, the receiver, associated electronics assemblies and a computer-like device.

As best seen in FIGS. 2 and 3, an active sonar system 30 (FIG. 3) in accordance with the present invention includes a projector assembly 32 in the form of a one-dimensional array of N projector elements 34. For example, there may be sixteen projector elements 34. More specifically, the projector assembly 32 includes a first projector element $34a$, a second projector element $34b$, a third projector element $34c$, a fourth projector element $34d$, . . . and an N-1 projector element $34e$, and an Nth projector element $34f$. One example of a suitable projector array is a projector array of an STA-016 Forward Looking Sonar, which is available from Sonatech, Inc. of Santa Barbara, Calif. The projector elements $34a–f$, which are preferably transducers, are conventional and should be understood by those skilled in the art. The projector elements $34a–e$ are preferably vertically arranged and contiguous. Each of the projector elements $34a–e$ projects one or more signals, which are most preferably sound waves that are projected into water. A reflected portion of the signals is received by a receiver assembly 36 of the sonar system 30, as described below.

As best seen in FIG. 3, the sonar system 30 further includes a computer-like device 38. Whereas a computer 38 is shown in FIG. 3, the computer may be replaced with any device suitable for facilitating the operations of the present invention. The computer 38 includes a processor 40 and a memory 42. The memory 42 can include one or more read-only memories, random access memories, and data storage devices. The data storage devices may be in the form of one or more hard disks and drives therefor, floppy disks and drives therefor, CD-ROMs and drives therefor, digital video disks and drives therefor, memory cards, or the like. The computer 38 further includes an output data interface 44 and an input data interface 46, and user interface components (not shown). The components of the computer 38 are operatively interconnected by a bus 48. Except for the manner in which the computer 38 is used and the software modules and data contained thereby, the computer is conventional and should be understood by those skilled in the art.

A separate output electronics assembly 50 extends between the output data interface 44 and each of the projector elements $34a–f$. Each output electronics assembly 50 includes a digital-to-analog converter 52 and analog conditioning electronics 54 that are designed to drive the respective projector elements as directed by the computer 38. The output electronics assemblies 50 are conventional and should be understood by those skilled in the art.

The receiver assembly 36 consists of an array of M receiver elements 56, only two of which are illustrated in FIG. 3 and identified as receiver element $56a$ and $56b$. For example, there may be forty-eight receiver elements 56. The receiver elements 56, which are preferably hydrophones, are conventional and should be understood by those skilled in the art. One example of a suitable receiver array is a receiver array of an STA-016 Forward Looking Sonar, which is available from Sonatech, Inc. A separate input electronics assembly 58 extends between each of the receiver elements 56 and the input data interface 46. Each input electronics assembly 58 includes analog conditioning electronics 60 and an analog-to-digital converter 62 to convert the output of the receiver elements into a proper form for analysis by the computer 38. The input electronics assemblies 58 are conventional and should be understood by those skilled in the art. The computer 38 and the electronics assemblies 50 and 58 may together be characterized as a processing system.

Operation of Sonar System

The computer 38 operates in conjunction with the output electronics assemblies 50 so that a group of signals, which can be characterized as a first signal $s_1(t)$, a second signal $s_2(t)$ and a third signal $s_3(t)$, are contemporaneously projected from the projector 32 on a periodic basis. Each of the first, second and third signals $s_1(t)$, $s_2(t)$ and $s_3(t)$ are preferably sound wave signals. The first signal $s_1(t)$ and the second signal $s_2(t)$ are preferably orthogonal, and the third signal $s_3(t)$ is preferably the sum of the first signal $s_1(t)$ and the second signal $s_2(t)$. Whereas it is preferred for the first and second signals $s_1(t)$ and $s_2(t)$ to be perfectly orthogonal, the present invention can be practiced so long as those signals are nearly, or substantially, orthogonal. Two signals $s_1(t)$ and $s_2(t)$ that are defined over T seconds are orthogonal if the integral of their product, taken over the time-duration of the signals, is zero. That is, $$\int_{-T/2}^{T/2} s_1(t)s_2(t-\tau)dt = 0 \text{ for all } \tau$$

An example of a pair of nearly or substantially orthogonal signals is an uplinear frequency modulated (LFM) pulse and a down-LFM pulse, which should be understood by those skilled in the art. Substantially orthogonal signals should also be understood to include perfectly orthogonal signals.

In accordance with one method of operation, waveforms corresponding to each of the first, second and third signals $s_1(t)$, $s_2(t)$ and $s_3(t)$ may be stored in the memory 42. Those waveforms are periodically retrieved from the memory 42 by the processor 40, which appropriately directs the waveforms to the output data interface 44. Alternatively, waveforms corresponding to only the first and second signals $s_1(t)$ and $s_2(t)$ may be stored in the memory 42, and the processor 40 may retrieve those waveforms and form therefrom a waveform corresponding to the third signal $s_3(t)$, which is the sum of the first and second signals. Thereafter, the processor appropriately directs the three waveforms to the output data interface 44.

As indicated in the following table, the first signal $s_1(t)$ is projected from the first projector element 34a, and the second signal $s_2(t)$ is projected from the Nth projector element 34f. As also indicated in the table, each of the intermediate projector elements, namely, the second projector element 34b, third projector element 34c, fourth projector element 34d, . . . and N-1 projector element 34e, project the third signal $s_3(t)$.

| Projector Element | Signal Transmitted |
|---|---|
| 1st (for example, element 34a) | $s_1(t)$ |
| 2nd (for example, element 34b) | $s_3(t)$ (that is, $s_1(t)$ and $s_2(t)$) |
| 3rd (for example, element 34c) | $s_3(t)$ (that is, $s_1(t)$ and $s_2(t)$) |
| 4th (for example, element 34d) | $s_3(t)$ (that is, $s_1(t)$ and $s_2(t)$) |
| . . . | $s_3(t)$ (that is, $s_1(t)$ and $s_2(t)$) |
| . . . | $s_3(t)$ (that is, $s_1(t)$ and $s_2(t)$) |
| . . . | $s_3(t)$ (that is, $s_1(t)$ and $s_2(t)$) |
| N-1 (for example, element 34e) | $s_3(t)$ (that is, $s_1(t)$ and $s_2(t)$) |
| Nth (for example, element 34f) | $s_2(t)$ |

Because the third signal $s_3(t)$ is the sum of the first signal $s_1(t)$ and the second signal $s_2(t)$, each of the intermediate projector elements can be characterized as contemporaneously projecting both the first signal $s_1(t)$ and the second signal $s_2(t)$. As best seen with reference to both of FIGS. 2 and 4, because the first projector element 34a, second projector element 34b, third projector element 34c, fourth projector element 34d . . . and the N-1 projector element 34e contemporaneously project the first signal $s_1(t)$, those projector elements 34a–e can be characterized as operating together as a first pseudo projector 64. Because the second projector element 34b, third projector element 34c, fourth projector element 34d, . . . , N-1 projector element 34e, and Nth projector element 34f contemporaneously project the second signal $s_2(t)$, those projector elements 34b–f can be characterized as operating together as a second pseudo projector 66.

Figure 4:
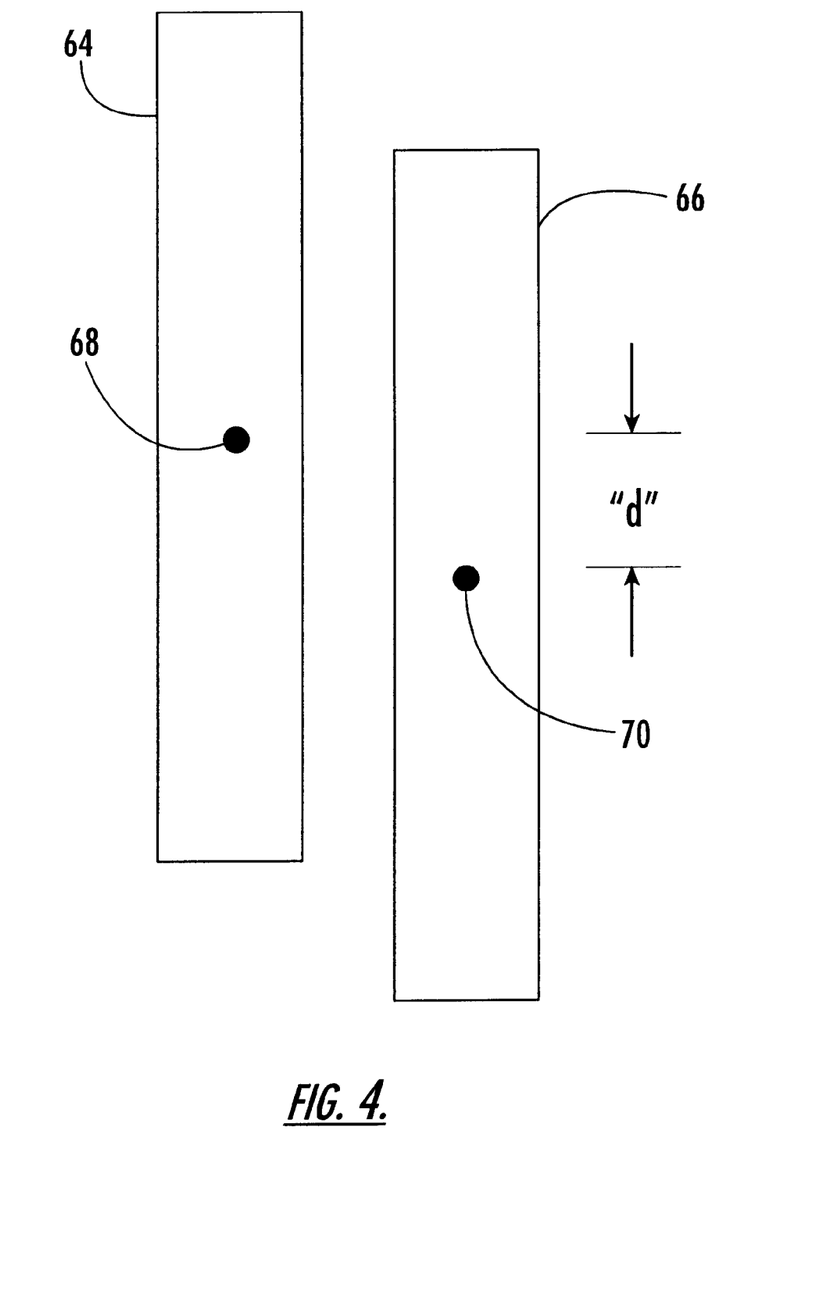
FIG. 4 diagrammatically illustrates two pseudo projectors that are provided by the projector of the present invention.

As best seen in FIG. 4, the first pseudo projector 64 defines a first center 68, the second pseudo projector 66 defines a second center 70, and a vertical separation distance "d" is defined between those centers. FIG. 4 is diagrammatic in nature because it shows the pseudo projectors 64 and 66 in a side-by-side relationship, so as to clearly show the separation distance "d". However, it may be more accurate to characterize the pseudo projectors 64 and 66 as partially overlapping, since they share the second projector element 34b through the N-1 projector element 34e.

It is within the scope of the present invention to increase the separation distance "d" by decreasing the number of projector elements 34 that project the third signal $s_3(t)$. That is, the separation distance "d" can be increased by decreasing the number of projector elements 34 that transmit both the first and second signals $s_1(t)$ and $s_2(t)$. For example, in accordance with an alternative embodiment the projector elements operate as described above, except the second projector element 34b transmits solely the first signal $s_1(t)$ and the N-1 projector element 34e transmits solely the second signal $s_2(t)$ while the third projector element 34c and the fourth projection element 34d transmit the third signal $s_3(t)$. In accordance with another alternative embodiment of the present invention, the projector 32 only includes the first and second projector elements 34a and 34b, and the first projector element projects the first signal $s_1(t)$ while the second projector element projects the second signal $s_2(t)$.

Figure 5:
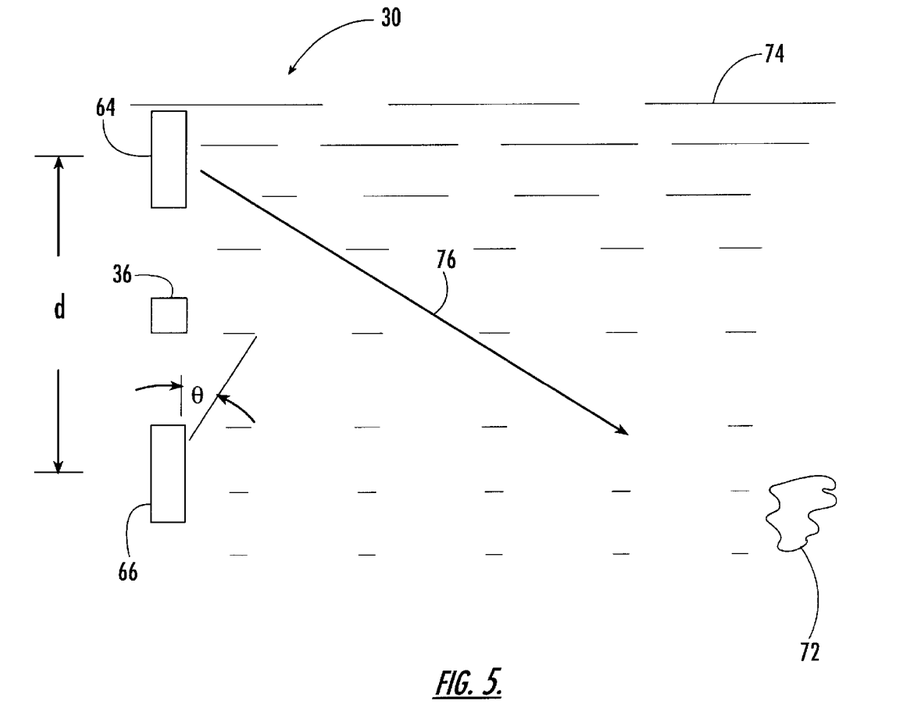
FIG. 5 diagrammatically illustrates the sonar system of one embodiment of the present invention being used to locate an object in a body of water.

Operation of the sonar system 30 may be best understood with reference to FIG. 5, in which the sonar system 30 is illustrated as being used to locate an object 72 suspended within a body of water 74. Each of the first pseudo projector 64 and the second pseudo projector 66 contemporaneously transmit their first signal $s_1(t)$ and second signal $s_2(t)$, respectively. The first and second signals $s_1(t)$ and $s_2(t)$ are transmitted periodically for a duration that is less than the period. The period will be varied depending upon the distance to the object 72. Nonetheless, as one example, a suitable period and duration may be 1.0 second and 0.01 second, respectively. A portion of the first and second signals $s_1(t)$ and $s_2(t)$ encounters the object 72 and is reflected back to the sonar system 30 as an echo. A direction of projection arrow 76 illustrates the direction that the first signal $s_1(t)$ travels from the first pseudo projector 64 to the object 72. A vertical arrival angle θ that partially defines the position of the object 72 is the angle of intersection between a line perpendicular to the direction of projection arrow 76 and the vertical plane of the projectors 64 and 66. In accordance with the present invention, the vertical arrival angle θ is solved from:

$$D = d\sin(\theta)/c$$

In accordance with the present invention, inputs for solving for the vertical arrival angle θ from the above equation consist of:

replica of output from the
first pseudo projector 64:

$$r_1(t)=s_1(t)+n_1(t)$$

replica of output from the
second pseudo projector 66:

$$r_2(t)=s_2(t)+n_2(t)$$

echo at the receiver 36:

$$r_3(t)=A_1s_1(t-\tau)+A_2s_2(t-\tau-D)+n_3(t)$$

In the immediately preceding equations, $n_1(t)$ and $n_2(t)$ are the noise present in the first and second signals, respectively, and are typically zero for noise-free replicas. In addition, $n_3(t)$ is a zero mean white Gaussian noise waveform. Typically, $s_1(t)$ and $s_2(t)$ are uncorrelated. Each of the signals $s_1(t)$, $s_2(t)$ and $s_3(t)$ is a pulse of length T seconds. The term "A" is the respective amplitude. The delay "$\tau$" is the delay between transmission of the signal $s_1(t)$ and reception of the corresponding echo at the receiver 36. The delay "D" is the delay between the reception of the echo corresponding to the signal $s_1(t)$ and the echo corresponding to the signal $s_2(t)$ at the receiver 36. The term "c" is a constant representative of the speed of the projected signals $s_1(t)$, $s_2(t)$ and $s_3(t)$ through the respective medium which in accordance with the preferred embodiment of the present invention is speed of sound in water. From the foregoing, the vertical arrival angle $\theta$ is calculated by the sonar system 30, such as by way of operations carried out by the computer 38 (FIG. 3) in a manner known to those skilled in the art.

In addition to providing an indication of the location of the object 72 through the calculation of the vertical arrival angle $\theta$, the sonar system 30 can determine the distance between the sonar system and the object by determining the time required for an echo of any one of the signal $s_1(t)$, $s_2(t)$ or $s_3(t)$ to return to the sonar system from the object. Determination of the distance between a sonar system and an object is conventional and should be understood by those skilled in the art. As such, the sonar system can precisely locate an object.

The sonar system 30 is preferably mounted to a watercraft (not shown), such as an unmanned undersea vehicle, in a manner that should be understood by those skilled in the art. For example, the projector 32 (FIGS. 2, 3 and 5) and receiver 36 (FIGS. 3 and 5) may be mounted to the external surface of the hull of the watercraft, whereas the remainder of the sonar system 30 may be carried within the watercraft.

The sonar system 30 may be used to estimate the vertical angle of echoes from objects such as mines. Knowledge of the vertical angle to an object, as well as to the bottom, makes it possible to determine if that object is suspended in the water column. If so, the object can be classified as a mine-like object. The sonar system 30 may also be used for any of the other typical applications of sonar, such as: the detection of submarines, torpedoes, water depth, fish, underground pipelines and wrecks; navigation; mapping the ocean floor; determining characteristics of ocean bottom sediments; measuring water current profiles; and the like.

Whereas the present invention is described in the context of a one-dimensional vertical array of projector elements, in view of this disclosure those skilled in the art will appreciate that the concepts of the present invention can be applied to two-dimensional arrays of projector elements and to the calculation of horizontal arrival angles by creating two or more pseudo projectors using a separation distance between their respective centers. Those skilled in the art will also appreciate that the present invention can be implemented through the use of known electrical components and known programming languages, and that based upon this disclosure electrical components can be assembled and software modules can be written to implement the present invention.

Theoretical Analysis

In theory, the sonar system 30 of the present invention, which has been described above with reference to FIGS. 2–5, is believed to be as accurate as the conventional sonar system 10 described above with reference to FIG. 1. More specifically, the sonar system 30 can be shown through analysis to have the same accuracy as a conventional sonar system 10, in terms of the Cramer-Rao Lower Bound (CRLB) of the vertical arrival angle $\theta$ variance. Such an analysis is shown in the H. Messer et al. document that has been incorporated herein by reference. The CRLB is discussed in B. Friedlander, *On the Cramer-Rao Bound for Time Delay and Doppler Estimation,* IEEE Transactions on Information Theory, Vol. IT-30, No. 3, May 1984, pp. 575–580, which is incorporated herein by reference.

More specifically, the sonar system 10 and the sonar system 30 provide the same measurement accuracy if we select s(t) in the following equations (A-1), and $s_1(t)$ and $s_2(t)$ in the following equations (B-1) so that their power spectral densities are identical, and set $A=A_1=A_2$ in the following equations (A-1) and (B-1). Then, the resulting Fisher Information Matrix (which is discussed in greater detail below) for each of the sonar systems 10 and 30 is identical. That is, the following equations (A-10) and (B-8) are equal. Therefore, the CRLB for the variance of the vertical arrival angle $\theta$ is identical for each of the sonar systems 10 and 30.

CRLB for Prior Sonar System

In this section, the CRLB for the vertical arrival angle $\theta$ (FIG. 1) for the prior sonar system 10 illustrated in FIG. 1 is obtained. The input to the analysis is:

replica of output from the projector 16:

$$r_1(t)=s(t)+n_1(t)$$

echo at the lower receiver 18:

$$r_2(t)=As(t-\tau)+n_2(t)$$

echo at the upper receiver 20:

$$r_3(t)=As(t-\tau-D)+n_3(t) \tag{A-1}$$

Because $r_1(t)$ is a replica, there is no noise so $n_1(t)$ is zero. As is done in D. Guili, M. Fossi, and L. Facheris, *Radar Target Scattering Matrix Measurement Through Orthogonal Signals,* IEEE Proceedings-F, Vol. 140, No. 4, August 1993, pp. 233–242, which is incorporated herein by reference, Whittle's theorem is used to evaluate the Fisher Information Matrix (FIM), from which the CRLB is obtained. The ij-th element of the FIM is given by equation (5) of Guili et al. as:

$$J_{ij} = \frac{T}{4\pi}\int_0^{2\pi} tr\left\{\frac{\partial S(\omega)}{\partial \alpha_i}S^{-1}(\omega)\frac{\partial S(\omega)}{\partial \alpha_j}S^{-1}(\omega)\right\}d\omega \tag{A-2}$$

where tr{ . . . } denotes the trace of a matrix. For the purposes of this discussion, $\alpha_1=D$ and $\alpha_2=T$. The matrix $S(\omega)$ is the power spectral density matrix of the vector $[r_1(t), r_2(t), r_3(t)]^T$ in (A-1), and is evaluated as follows: The Fourier transforms of the inputs in (A-1) are:

$$R(\omega) = \begin{bmatrix} S(\omega) \\ A\exp(j\omega\tau)S(\omega) + N_2(\omega) \\ A\exp[j\omega(\tau+D)]S(\omega) + N_3(\omega) \end{bmatrix} \tag{A-3}$$

$$S(\omega) = E\{R(\omega)R^T(\omega)\} \quad \text{(A-4)}$$

$$= \begin{bmatrix} \Psi_S(\omega) & A\exp(j\omega\tau)\Psi_S(\omega) & A\exp[j\omega(\tau+D)]\Psi_S(\omega) \\ A\exp(-j\omega\tau)\Psi_S(\omega) & A^2\Psi_S(\omega)+\Psi_{N2}(\omega) & A^2\exp(j\omega D)\Psi_S(\omega) \\ A\exp[-j\omega(\tau+D)]\Psi_S(\omega) & A^2\exp(-j\omega D)\Psi_S(\omega) & A^2\Psi_S(\omega)+\Psi_{N3}(\omega) \end{bmatrix}$$

where $\Psi_S(\omega)$ is the signal spectrum and $\psi_{N2}(\omega)$ and $\Psi_{N3}(\omega)$ are the noise spectra of $n_2(t)$ and $n_3(t)$, respectively. We now calculate the various terms required in (A-2) (specific references to o) are omitted for notational convenience).

$$S^{-1} = \frac{1}{det(S)}\begin{bmatrix} A^2\Psi_S(\Psi_{N2}+\Psi_{N3})+\Psi_{N2}\Psi_{N3} & -A\exp(j\omega\tau)\Psi_S\Psi_{N3} & -A\exp[j\omega(\tau+D)]\Psi_S\Psi_{N2} \\ -A\exp(-j\omega\tau)\Psi_S\Psi_{N3} & \Psi_S\Psi_{N3} & 0 \\ -A\exp[-j\omega(\tau+D)]\Psi_S\Psi_{N2} & 0 & \Psi_S\Psi_{N2} \end{bmatrix} \quad \text{(A-5)}$$

where $\det(S) = \psi_S \psi_{N2} \psi_{N3}$ $$\frac{\partial S}{\partial \tau} = \begin{bmatrix} 0 & j\omega A\exp(j\omega\tau)\Psi_S & j\omega A\exp[j\omega(\tau+D)]\Psi_S \\ -j\omega A\exp(-j\omega\tau)\Psi_S & 0 & 0 \\ -j\omega A\exp[-j\omega(\tau+D)]\Psi_S & 0 & 0 \end{bmatrix} \quad \text{(A-6)}$$

$$\frac{\partial S}{\partial D} = \begin{bmatrix} 0 & 0 & j\omega A\exp[j\omega(\tau+D)]\Psi_S \\ 0 & 0 & j\omega A^2\exp(j\omega D)\Psi_S \\ -j\omega A\exp[-j\omega(\tau+D)]\Psi_S & -j\omega A^2\exp(-j\omega D)\Psi_S & 0 \end{bmatrix} \quad \text{(A-7)}$$

Using (A-5), (A-6), and (A-7) to evaluate the four traces in (A-2) gives:

$$tr\left\{\frac{\partial S}{\partial D}S^{-1}\frac{\partial S}{\partial D}S^{-1}\right\} = \frac{2\omega^2 A^2 \Psi_S}{\Psi_{N3}} \quad \text{(A-8)}$$

$$tr\left\{\frac{\partial S}{\partial \tau}S^{-1}\frac{\partial S}{\partial \tau}S^{-1}\right\} = 2\omega^2 A^2 \Psi_S\left(\frac{\Psi_{N2}+\Psi_{N3}}{\Psi_{N2}\Psi_{N3}}\right)$$

$$tr\left\{\frac{\partial S}{\partial \tau}S^{-1}\frac{\partial S}{\partial D}S^{-1}\right\} = tr\left\{\frac{\partial S}{\partial D}S^{-1}\frac{\partial S}{\partial \tau}S^{-1}\right\} = \frac{2\omega^2 A^2 \Psi_S}{\Psi_{N3}}$$

Finally, the FIM is found by substituting (A-8) into (A-2):

$$FIM = J = \begin{bmatrix} J_{DD} & J_{D\tau} \\ J_{\tau D} & J_{\tau\tau} \end{bmatrix} = \begin{bmatrix} \dfrac{T}{4\pi}\int_0^{2\pi} \dfrac{2\omega^2 A^2 \psi_S(\omega)}{\Psi_{N3}(\omega)} d\omega & \dfrac{T}{4\pi}\int_0^{2\pi} \dfrac{2\omega^2 A^2 \psi_S(\omega)}{\Psi_{N3}(\omega)} d\omega \\ \dfrac{T}{4\pi}\int_0^{2\pi} \dfrac{2\omega^2 A^2 \psi_S(\omega)}{\Psi_{N3}(\omega)} d\omega & \dfrac{T}{4\pi}\int_0^{2\pi} \dfrac{2\omega^2 A^2 \psi_S(\omega)[\Psi_{N2}(\omega)+\Psi_{N3}(\omega)]}{\Psi_{N2}(\omega)\Psi_{N3}(\omega)} d\omega \end{bmatrix} \quad \text{(A-9)}$$

It typically is reasonable to assume that the noise spectra at the two receivers are identical. That is, $\Psi_{N2}(\psi) = \Psi_{N3}(\omega) = \psi_N(\omega)$. Then the FIM in (A-9) simplifies to:

$$J = \begin{bmatrix} \dfrac{T}{4\pi}\int_0^{2\pi} \dfrac{2\omega^2 A^2 \psi_S(\omega)}{\Psi_N(\omega)} d\omega & \dfrac{T}{4\pi}\int_0^{2\pi} \dfrac{2\omega^2 A^2 \psi_S(\omega)}{\Psi_N(\omega)} d\omega \\ \dfrac{T}{4\pi}\int_0^{2\pi} \dfrac{2\omega^2 A^2 \psi_S(\omega)}{\Psi_N(\omega)} d\omega & \dfrac{T}{4\pi}\int_0^{2\pi} \dfrac{4\omega^2 A^2 \psi_S(\omega)}{\Psi_N(\omega)} d\omega \end{bmatrix} \quad \text{(A-10)}$$

The CRLB's for D and $\tau$ are found next.

$$CRLB(D) = \frac{J_{\tau\tau}}{J_{DD}J_{\tau\tau}-J_{D\tau}J_{\tau D}} = \frac{2}{\dfrac{T}{4\pi}\int_0^{2\pi} \dfrac{2\omega^2 A^2 \psi_S(\omega)}{\Psi_N(\omega)} d\omega} \quad \text{(A-11)}$$

$$CRLB(\tau) = \frac{J_{DD}}{J_{DD}J_{\tau\tau}-J_{D\tau}J_{\tau D}} = \frac{1}{\dfrac{T}{4\pi}\int_0^{2\pi} \dfrac{2\omega^2 A^2 \psi_S(\omega)}{\Psi_N(\omega)} d\omega} \quad \text{(A-12)}$$

The CRLB for delay, D, can be converted to the CRLB for the vertical arrival angle $\theta$, by observing that $$D = \frac{d}{c}\sin(\theta).$$

Thus, $$\frac{\partial S}{\partial \theta} = \frac{\partial S}{\partial D}\frac{\partial D}{\partial \theta} = \frac{d}{c}\cos(\theta)\frac{\partial S}{\partial D},$$

and the FIM for θ and τ is:

$$\begin{bmatrix} J_{\theta\theta} & J_{\theta\tau} \\ J_{\tau\theta} & J_{\tau\tau} \end{bmatrix} = \begin{bmatrix} \left(\dfrac{d}{c}\right)^2 \cos^2(\theta) J_{DD} & \dfrac{d}{c}\cos(\theta) J_{D\tau} \\ \dfrac{d}{c}\cos(\theta) J_{\tau D} & J_{\tau\tau} \end{bmatrix}$$

Then:

$$CRLB(\theta) = \frac{CRLB(D)}{\left(\dfrac{d}{c}\right)^2 \cos^2(\theta)}$$

CRLB for Sonar System of Present Invention

In this section, the Fisher Information Matrix (FIM) for the vertical arrival angle θ (FIG. 5) for the sonar system 30 described with reference to FIGS. 2–5 is obtained. The input to the analysis is
replica of output from the
first pseudo projector 64:

$$r_1(t) = s_1(t) + n_1(t)$$

replica of output from the second pseudo projector 66:

$$r_2(t) = s_2(t) + n_2(t)$$

echo at the receiver 36:

$$r_3(t) = A_1 s_1(t-\tau) + A_2 s_2(t-\tau-D) + n_3(t) \quad \text{(B-1)}$$

Because $r_1(t)$ and $r_2(t)$ are replicas, there is no noise so $n_1(t)$ and $n_2(t)$ are zero. The development has the same form as that given above with respect to the prior sonar system 10. That is, we use Whittle's theorem to evaluate the FIM, from which the CRLB is obtained, and the ij-th element of the FIM is given by (A-2). The matrix $S(\omega)$ is the power spectral density matrix of the vector $[r_1(t), r_2(t), r_3(t)]^T$ in (B-1), and is evaluated as follows: The Fourier transforms of the inputs in (B-1) are:

$$R(\omega) = \begin{bmatrix} S_1(\omega) \\ S_2(\omega) \\ A_1 \exp(j\omega\tau) S_1(\omega) + A_2 \exp[j\omega(\tau+D)] S_2(\omega) + N_3(\omega) \end{bmatrix} \quad \text{(B-2)}$$

$$S(\omega) = E\{R(\omega) R^T(\omega)\}$$

$$S(\omega) = E\{R(\omega) R^T(\omega)\} \quad \text{(B-3)}$$

$$= \begin{bmatrix} \Psi_{S1}(\omega) & 0 & A_1\exp(j\omega\tau)\Psi_{S1}(\omega) \\ 0 & \Psi_{S2}(\omega) & A_2\exp[j\omega(\tau+D)]\Psi_{S2}(\omega) \\ A_1\exp(-j\omega\tau)\Psi_{S1}(\omega) & A_2\exp[-j\omega(\tau+D)]\Psi_{S2}(\omega) & A_1^2\Psi_{S1}(\omega) + A_2^2\Psi_{S2}(\omega) + \Psi_{N3}(\omega) \end{bmatrix}$$

where $\Psi_{s1}(\omega)$ and $\Psi_{s2}(\omega)$ are the signal spectra and $s_1(t)$ and $s_2(t)$, and $\Psi_{N3}(\omega)$ is the noise spectrum of $n_3(t)$. We now calculate the various terms required in (A-2). (Specific references to ω are omitted for notational convenience.)

$$S^{-1} = \frac{1}{\det(S)} \begin{bmatrix} A_1^2\Psi_{S1}\Psi_{S2} + \Psi_{S2}\Psi_{N3} & A_1A_2\exp(-j\omega D)\Psi_{S1}\Psi_{S2} & -A_1\exp(j\omega\tau)\Psi_{S1}\Psi_{S2} \\ A_1A_2\exp(j\omega D)\Psi_{S1}\Psi_{S2} & A_2^2\Psi_{S1}\Psi_{S2} + \Psi_{S1}\Psi_{N3} & -A_2\exp[j\omega(\tau+D)]\Psi_{S1}\Psi_{S2} \\ -A_1\exp(-j\omega\tau)\Psi_{S1}\Psi_{S2} & -A_2\exp[-j\omega(\tau+D)]\Psi_{S1}\Psi_{S2} & \Psi_{S1}\Psi_{S2} \end{bmatrix} \quad \text{(B-4)}$$

where $\det(S) = \Psi_{S1}\Psi_{S2}\Psi_{N3}$ $$\frac{\partial S}{\partial \tau} = \begin{bmatrix} 0 & 0 & j\omega A_1\exp(j\omega\tau)\Psi_{S1} \\ 0 & 0 & j\omega A_2\exp[j\omega(\tau+D)]\Psi_{S2} \\ -j\omega A_1\exp(-j\omega\tau)\Psi_{S1} & -j\omega A_2\exp[-j\omega(\tau+D)]\Psi_{S2} & 0 \end{bmatrix} \quad \text{(B-5)}$$

$$\frac{\partial S}{\partial D} = \begin{bmatrix} 0 & 0 & 0 \\ 0 & 0 & j\omega A_2\exp[j\omega(\tau+D)]\Psi_{S2} \\ 0 & -j\omega A_2\exp[-j\omega(\tau+D)]\Psi_{S2} & 0 \end{bmatrix} \quad \text{(B-6)}$$

Using (B-4), (B-5), and (B-6) to evaluate the four traces in (A-2) gives:

$$\text{tr}\left\{\frac{\partial S}{\partial D}S^{-1}\frac{\partial S}{\partial D}S^{-1}\right\} = \frac{2\omega^2 A_2^2 \Psi_{S2}}{\Psi_{N3}} \quad \text{(B-7)}$$

$$\text{tr}\left\{\frac{\partial S}{\partial \tau}S^{-1}\frac{\partial S}{\partial \tau}S^{-1}\right\} = 2\omega^2\left(\frac{A_1^2\Psi_{S1} + A_2^2\Psi_{S2}}{\Psi_{N3}}\right)$$

$$\text{tr}\left\{\frac{\partial S}{\partial \tau}S^{-1}\frac{\partial S}{\partial D}S^{-1}\right\} = \text{tr}\left\{\frac{\partial S}{\partial D}S^{-1}\frac{\partial S}{\partial \tau}S^{-1}\right\} = \frac{2\omega^2 A_2^2 \Psi_{S2}}{\Psi_{N3}}$$

Finally, the FIM is found by substituting (B-7) into (A-2):

$$FIM = \begin{bmatrix} J_{DD} & J_{D\tau} \\ J_{\tau D} & J_{\tau\tau} \end{bmatrix} = \begin{bmatrix} \frac{T}{4\pi}\int_0^{2\pi}\frac{2\omega^2 A_2^2 \Psi_{S2}(\omega)}{\Psi_{N3}(\omega)}d\omega & \frac{T}{4\pi}\int_0^{2\pi}\frac{2\omega^2 A_2^2 \Psi_{S2}(\omega)}{\Psi_{N3}(\omega)}d\omega \\ \frac{T}{4\pi}\int_0^{2\pi}\frac{2\omega^2 A_2^2 \Psi_{S2}(\omega)}{\Psi_{N3}(\omega)}d\omega & \frac{T}{4\pi}\int_0^{2\pi}\frac{2\omega^2[A_1^2\Psi_{S1}(\omega) + A_2^2\Psi_{S2}(\omega)]}{\Psi_{N3}(\omega)}d\omega \end{bmatrix} \quad \text{(B-8)}$$

As mentioned above, the above equations (A-10) and (B-8) are equal. Therefore, the CRLB for the variance of the vertical arrival angle θ is identical for the sonar system 30 of the present invention (described above with reference to FIGS. 2–5) and the conventional sonar system 10 (described above with reference to FIG. 1).

Because the sonar system of the present invention is capable of having a single receiver array and a single projector array, which has a first subset of projector elements that function as a first pseudo projector and a second subset of projector elements that function as a second pseudo projector, the sonar system is well suited for applications in which space, power, weight and processing resources are limited. In addition, the sonar system of the present invention can cost less than comparable prior sonar systems.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. For example, whereas the present invention is described primarily in the context of a sonar system, those skilled in the art will appreciate that the present invention can be broadly characterized in the context of interferometers.

That which is claimed:

1. A sonar system comprising:
   at least one projector assembly comprising a plurality of projector elements, wherein:
      at least a first and a second of the projector elements are each operative to provide a first signal so that at least the first and second projector elements function together as a first projector that provides the first signal,
      at least a third of the projector elements and the second projector element are operative to provide a second signal so that at least the second and third projector elements function together as a second projector that provides the second signal, whereby the second projector element functions as part of both the first projector and the second projector, and
      respective centers of the first and second projectors are offset to thereby define a separation distance therebetween, and
   at least one receiver operative for receiving reflected portions of the first and second signals.

2. A sonar system according to claim 1, wherein the first projector and the second projector are operative to contemporaneously provide the first and second signals, such that the second projector element provides a third signal that is a sum of the first and second signals.

3. A sonar system according to claim 1, wherein the first and second projectors are operative so that first and second signals are at least substantially orthogonal.

4. A sonar system according to claim 1, wherein the projector elements are arranged in a vertically extending array.

5. A sonar system according to claim 1, wherein the first and second projectors are operative so that first and second signals are provided periodically, whereby a period is defined, and the first and second signals are provided for a duration that is shorter than the period.

6. A sonar system according to claim 1, wherein the first and second projectors are operative so that first and second signals are sound waves.

7. A sonar system according to claim 1, further comprising a processing system for analyzing the signals received by the receiver, wherein the processing system is operative for at least partially determining the position of an object.

8. A sonar projector comprising:
   a plurality of projector elements, wherein:
      at least a first of the projector elements is operative to provide a first signal and a second signal, wherein at least the first projector element functions as a first projector that provides the first signal,
      at least a second of the projector elements is operative to provide the second signal, wherein at least the first and second projector elements function together as a second projector that provides the second signal, whereby the first projector element functions as part of both the first projector and the second projector, and
      respective centers of the first and second projectors are offset to thereby define a separation distance therebetween.

9. A sonar projector according to claim 8, wherein the first projector and the second projector are operative to contemporaneously provide the first and second signals.

10. A sonar projector according to claim 9, wherein the first and second projectors are operative so that the first and second signals are at least substantially orthogonal.

11. A sonar projector according to claim 9, wherein the first and second projectors are operative so that the first and second signals are sound waves.

12. A sonar projector according to claim 9, wherein the projector elements are arranged in an array.

13. A sonar projector according to claim 9, in combination with at least one receiver operative for receiving reflected portions of the first and second signals.

14. A combination according to claim 13, further comprising a processing system for analyzing the signals received by the receiver, wherein the processing system is operative for at least partially determining the position an object.

15. An interferometer comprising:
at least one projector assembly comprising a plurality of projector elements, wherein:
at least a first and a second of the projector elements are each operative to provide a first signal so that at least the first and second projector elements function together as a first projector that provides the first signal,
at least a third of the projector elements and the second projector element are operative to provide a second signal so that at least the second and third projector elements function together as a second projector that provides the second signal, whereby the second projector element functions as part of both the first projector and the second projector, and
respective centers of the first and second projectors are offset to thereby define a separation distance therebetween.

16. An interferometer according to claim 15, further comprising:
at least one receiver operative for receiving reflected portions of the first and second signals; and
a processing system for analyzing the signals received by the receiver and operative to at least partially determine the position an object.

17. An interferometer according to claim 15, wherein the first projector and the second projector are operative to contemporaneously provide the first and second signals, such that the second projector element provides a third signal that is a sum of the first and second signals.

18. An interferometer according to claim 15, wherein the first and second projectors are operative so that the first and second signals are at least substantially orthogonal.

19. An interferometer according to claim 15, wherein the first and second projectors are operative so that the first and second signals are provided periodically for a duration that is shorter than the period.

* * * * *